US008085668B2

(12) United States Patent
Smith et al.

(10) Patent No.: US 8,085,668 B2
(45) Date of Patent: Dec. 27, 2011

(54) TIMESTAMP METERING AND ROLLOVER PROTECTION IN A NETWORK DEVICE

(75) Inventors: Brandon Carl Smith, Sunnyvale, CA (US); Jun Cao, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/508,406

(22) Filed: Jul. 23, 2009

(65) Prior Publication Data

US 2010/0046373 A1 Feb. 25, 2010

Related U.S. Application Data

(63) Continuation of application No. 11/078,484, filed on Mar. 14, 2005, now Pat. No. 7,577,096.

(60) Provisional application No. 60/653,938, filed on Feb. 18, 2005.

(51) Int. Cl.
*H04J 1/16* (2006.01)

(52) U.S. Cl. ..................................... 370/235.1; 370/503

(58) Field of Classification Search .................. 370/229, 370/230, 230.1, 235, 235.1, 503, 509, 412
See application file for complete search history.

(56) References Cited

U.S. PATENT DOCUMENTS

| | | | |
|---|---|---|---|
| 5,295,135 A | 3/1994 | Kammerl | |
| 5,414,704 A | 5/1995 | Spinney | |
| 5,423,015 A | 6/1995 | Chung | |
| 5,652,579 A | 7/1997 | Yamada et al. | |
| 5,745,477 A | 4/1998 | Zheng | |
| 5,802,287 A | 9/1998 | Rostoker et al. | |
| 5,831,980 A | 11/1998 | Varma et al. | |
| 5,892,922 A | 4/1999 | Lorenz | |
| 5,898,689 A | 4/1999 | Kumar | |
| 5,909,686 A | 6/1999 | Muller et al. | |
| 6,011,795 A | 1/2000 | Varghese et al. | |
| 6,016,310 A | 1/2000 | Muller et al. | |
| 6,041,053 A | 3/2000 | Douceur et al. | |
| 6,119,196 A | 9/2000 | Muller et al. | |
| 6,173,384 B1 | 1/2001 | Weaver | |
| 6,175,902 B1 | 1/2001 | Runaldue | |
| 6,188,698 B1 | 2/2001 | Galand et al. | |

(Continued)

FOREIGN PATENT DOCUMENTS

WO 9900950 A1 1/1999

(Continued)

OTHER PUBLICATIONS

Office Action received for U.S. Appl. No. 12/427,452, mailed on Nov. 23, 2010, 27 pages.

(Continued)

*Primary Examiner* — Gary Mui

(57) ABSTRACT

A network device for processing data on a data network includes a plurality of ports, configured to receive data from a data network and to send processed data to the data network, a memory management unit configured store data on and retrieve data from the memory and a metering unit configured to police a flow of the processed data to be sent to the network device. The metering unit is configured to utilize a series of leaky bucket units, where tokens are added to each leaky bucket unit only when that particular leaky bucket unit is accessed. The metering unit is also configured to add the tokens based on a prior timestamp value, a current timing value and an established rate and a multiplication to establish the tokens is accomplished by shifting a register of the established rate.

20 Claims, 11 Drawing Sheets

U.S. PATENT DOCUMENTS

| | | | |
|---|---|---|---|
| 6,222,841 | B1 | 4/2001 | Taniguchi |
| 6,259,699 | B1 | 7/2001 | Opaika et al. |
| 6,335,935 | B2 | 1/2002 | Kadambi et al. |
| 6,405,258 | B1 | 6/2002 | Erimli |
| 6,425,015 | B1 | 7/2002 | Jennings et al. |
| 6,591,200 | B1 | 7/2003 | Cohen et al. |
| 6,826,150 | B1 * | 11/2004 | Bhattacharya et al. ....... 370/230 |
| 6,940,818 | B2 | 9/2005 | Moran |
| 6,950,395 | B1 | 9/2005 | Bashandy |
| 6,970,426 | B1 | 11/2005 | Haddock |
| 7,327,682 | B2 | 2/2008 | Gandhi |
| 7,529,191 | B2 | 5/2009 | Smith et al. |
| 7,577,096 | B2 | 8/2009 | Smith et al. |
| 2002/0036984 | A1 * | 3/2002 | Chiussi et al. ................ 370/232 |
| 2003/0174649 | A1 | 9/2003 | Shankar et al. |
| 2003/0185157 | A1 | 10/2003 | Chen et al. |
| 2004/0071166 | A1 | 4/2004 | Yen et al. |
| 2004/0125796 | A1 | 7/2004 | Reader |
| 2004/0151184 | A1 | 8/2004 | Wang et al. |
| 2004/0184404 | A1 | 9/2004 | Carpenter et al. |
| 2006/0164988 | A1 | 7/2006 | Mishra et al. |
| 2006/0176818 | A1 | 8/2006 | Olsen et al. |
| 2010/0202295 | A1 | 8/2010 | Smith et al. |

FOREIGN PATENT DOCUMENTS

| | | |
|---|---|---|
| WO | 0124428 A1 | 4/2001 |
| WO | 2004/023745 A1 | 3/2004 |

OTHER PUBLICATIONS

Office Action Response filed for U.S. Appl. No. 12/427,452, filed on Feb. 23, 2011, 7 pages.

Office Action received for U.S. Appl. No. 11/078,484, mailed on May 23, 2008, 17 pages.

Office Action Response filed for U.S. Appl. No. 11/078,484, filed on Jul. 23, 2008, 17 pages.

Office Action Response filed for U.S. Appl. No. 11/078,484, filed on Feb. 18, 2009, 13 pages.

Office Action received for U.S. Appl. No. 11/078,484, mailed on Nov. 19, 2008, 14 pages.

Notice of Allowance received for U.S. Appl. No. 11/078,484, mailed on Apr. 8, 2009, 6 pages.

Office Action received for U.S. Appl. No. 11/081,057, mailed on Nov. 5, 2007, 15 pages.

Office Action Response filed for U.S. Appl. No. 11/081,057, filed on Jan. 14, 2008, 26 pages.

Office Action received for U.S. Appl. No. 11/081,057, mailed on Apr. 23, 2008, 16 pages.

Office Action Response filed for U.S. Appl. No. 11/081,057, filed on Jun. 23, 2008, 24 pages.

Notice of Allowance received for U.S. Appl. No. 11/081,057, mailed on Nov. 3, 2008, 8 pages.

* cited by examiner

US 8,085,668 B2

TIMESTAMP METERING AND ROLLOVER PROTECTION IN A NETWORK DEVICE

CROSS-REFERENCE TO RELATED APPLICATIONS

This application is a continuation of application Ser. No. 11/078,484, filed on Mar. 14, 2005, now pending, which claims the benefit of U.S. Provisional Ser. No. 60/653,938, filed on Feb. 18, 2005. The subject matter of these earlier filed applications are hereby incorporated by reference.

BACKGROUND OF THE INVENTION

1. Field of the Invention

The present invention relates to a network device for processing data in a network device that allows for enhanced processing speeds as well as expandability.

2. Description of the Related Art

A network may include one or more network devices, such as Ethernet switches, each of which includes several modules that are used to process information that is transmitted through the device. Specifically, the device may include port interface modules, designed to send and receive data over a network, a Memory Management Unit (MMU), to store that data until it is forwarded or further processed and resolution modules, that allow the data to be reviewed and processed according to instructions. The resolution modules include switching functionalities for determining to which destination port data should be directed. One of the ports on the network device may be a CPU port that enables the device to send and receive information to and from external switching/routing control entities or CPUs.

Many network devices operate as Ethernet switches, where packets enter the device from multiple ports, where switching and other processing are performed on the packets. Thereafter, the packets are transmitted to one or more destination ports through the MMU. The MMU enables sharing of packet buffer among different ports while providing resource guarantees for every ingress port, egress port and class of service queue.

According to current switching system architectures, eight class of service queues are associated with each egress port. To ensure bandwidth guarantees across the ports and queues, the device includes a scheduler that provides arbitration across the class of service queues to ensure minimum and maximum bandwidth guarantees. One implementation for ensuring bandwidth guarantees across the queues associated with each port is to assign a fixed portion of the total bandwidth for the port to each queue. As such, a queue that is associated with a class of service with a high priority may be assigned a greater fixed portion than a queue that is associated with a lower priority class of service. The scheduler then processes packets in each queue, for example in a round robin fashion.

However, such an implementation is inflexible. For example, when a queue is idle, the bandwidth assigned to that queue is unused even if another queue requires more bandwidth than the amount allocated to it. As such packets may be dropped on one queue that is exceeding its allocated bandwidth while the bandwidth of an idle queue remains unused. Therefore, there is need for improved metering and scheduling process that allow for processing of data at required speeds and provides flexibility needed to utilize all of the resources of the network device.

BRIEF DESCRIPTION OF THE DRAWINGS

The accompanying drawings, which are included to provide a further under-standing of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
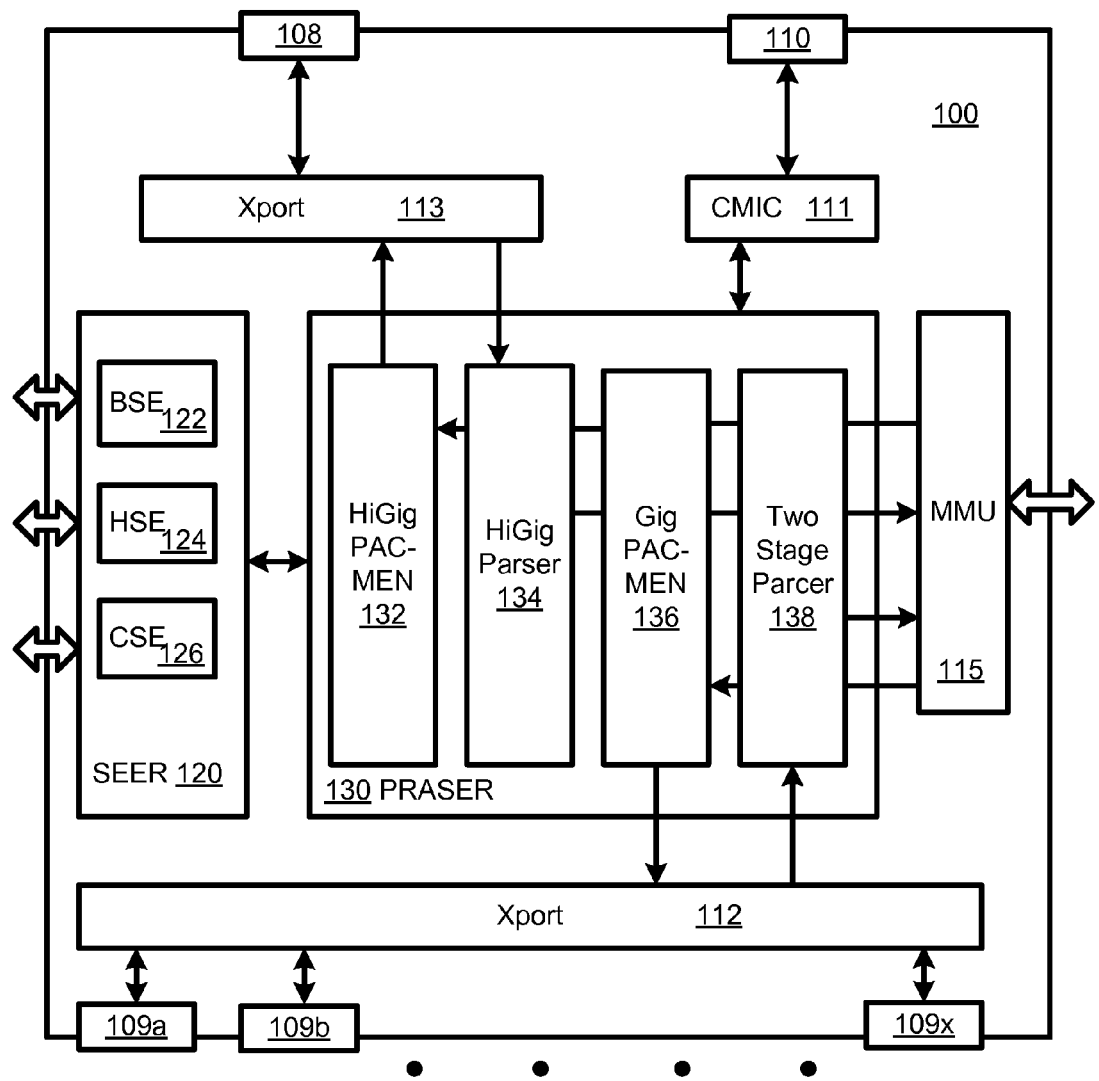
FIG. 1 illustrates a network device in which an embodiment of the present invention may be implemented.

FIG. 1 illustrates a network device, such as a switching chip, in which an embodiment the present invention may be implemented. Device 100 includes ingress/egress modules 112 and 113, a MMU 115, a parser 130 and a search engine 120. Ingress/egress modules are used for buffering of data and forwarding the data to the parser. The parser 130 parses the data received and performs look ups based on the parsed data using the search engine 120. The primary function of MMU 115 is to efficiently manage cell buffering and packet pointer resources in a predictable manner, even under severe congestion scenarios. Through these modules, packet modification can occur and the packet can be transmitted to an appropriate destination port.

According to several embodiments, the device 100 may also include one internal fabric high speed port, for example a HiGig™ port, 108, one or more external Ethernet ports 109a-109x, and a CPU port 110. High speed port 108 is used to interconnect various network devices in a system and thus form an internal switching fabric for transporting packets between external source ports and one or more external destination ports. As such, high speed port 108 may not externally visible outside of a system that includes the multiple interconnected network devices. CPU port 110 is used to send and receive information to and from external switching/routing control entities or CPUs. According to an embodiment of the invention, CPU port 110 may be considered as one of external Ethernet ports 109a-109x. Device 100 interfaces with external/off-chip CPUs through a CPU processing module 111, such as a CMIC, which interfaces with a PCI bus that connects device 100 to an external CPU.

In addition, the search engine module 120 may be composed of additional search engine modules, 122, 124 and 126, that are used to perform particular look ups that are used in the characterization and modification of data being processed by the network device 100. Likewise, the parser 130 also includes additional modules that are directed to parsing data received from the internal fabric high speed port 134 and the other ports 138, with other modules 132 and 136 for forwarding data back to the ports of the network device. The HiGig™ 134 and the two stage 138 parsers are discussed in greater detail below.

Network traffic enters and exits device 100 through external Ethernet ports 109a-109x. Specifically, traffic in device 100 is routed from an external Ethernet source port to one or more unique destination Ethernet ports. In one embodiment of the invention, device 100 supports twelve physical Ethernet ports 109, each of which can operate in 10/100/1000 Mbps speed and one high speed port 108 which operates in either 10 Gbps or 12 Gbps speed.

Figure 2:
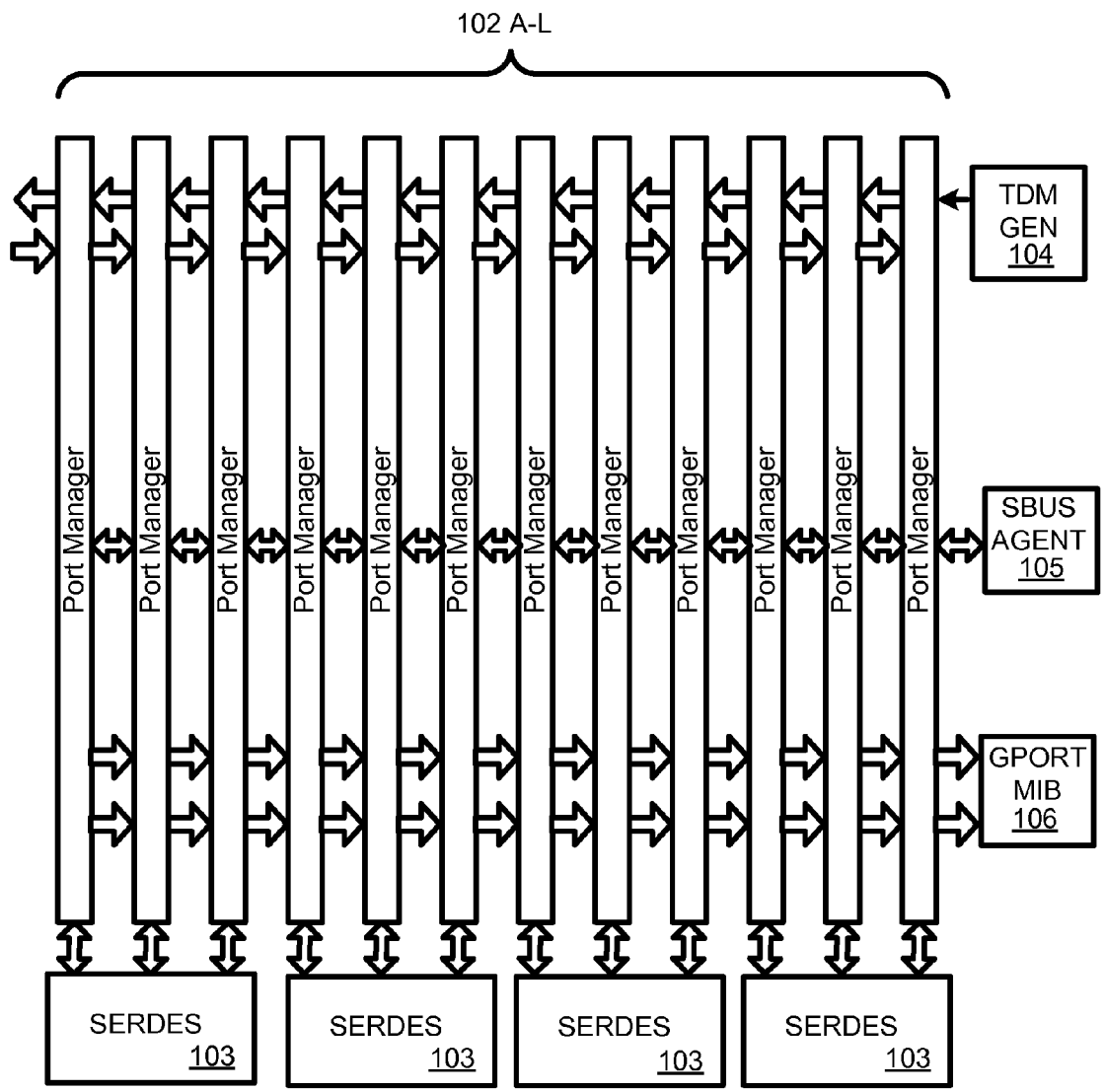
FIG. 2 illustrates a block diagram illustrating the communication using ports of the network device, according to an embodiment of the instant invention.

The structure of the physical ports 109 are further illustrated in FIG. 2. A series of serializing/deserializing modules 103 send and receive data, where data received as each port is managed by a port manager 102A-L. The series of port managers have a timing generator 104 and a bus agent 105 that facilitate their operation. The data received and transmitted to a port information base so that the flow can be monitored. It is noted that high speed port 108 has similar functionalities but does not require as many elements since only one port is being managed.

Figure 3A:
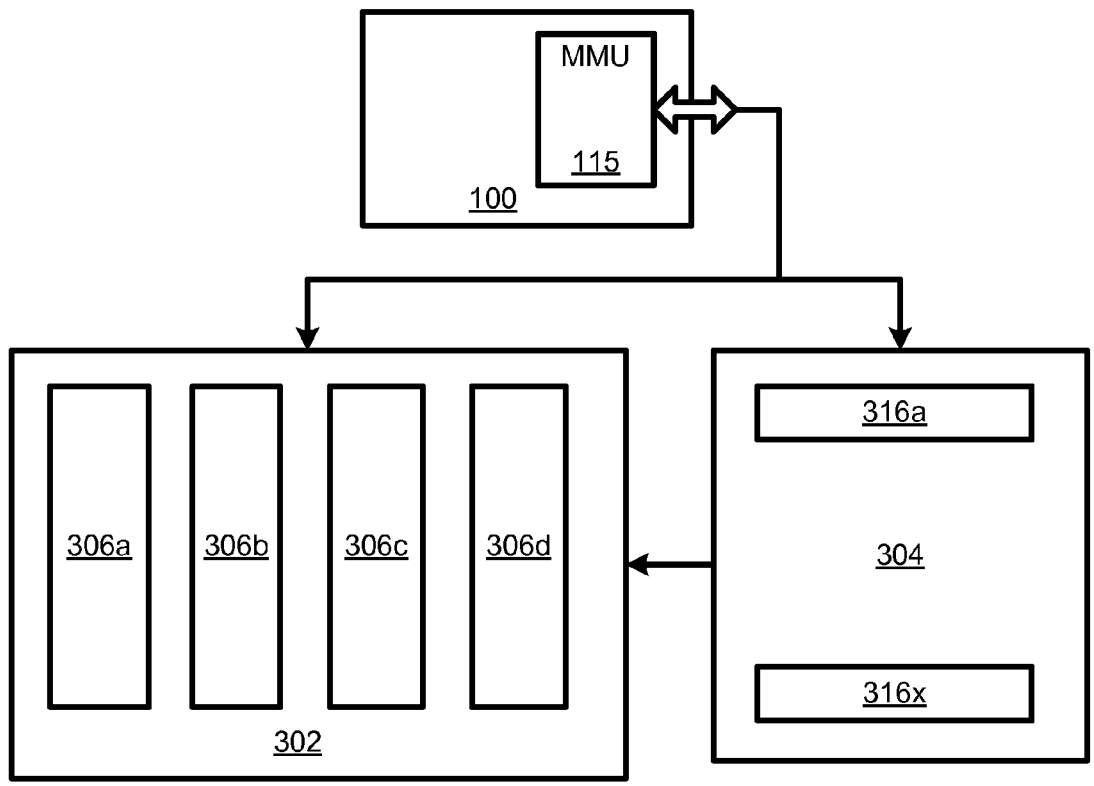
FIG. 3 illustrates memory structures to be used with the network device, with FIG. 3a illustrating the shared memory that is external to the network device and FIG. 3b illustrating the Cell Buffer Pool of the shared memory architecture.
Figure 3B:
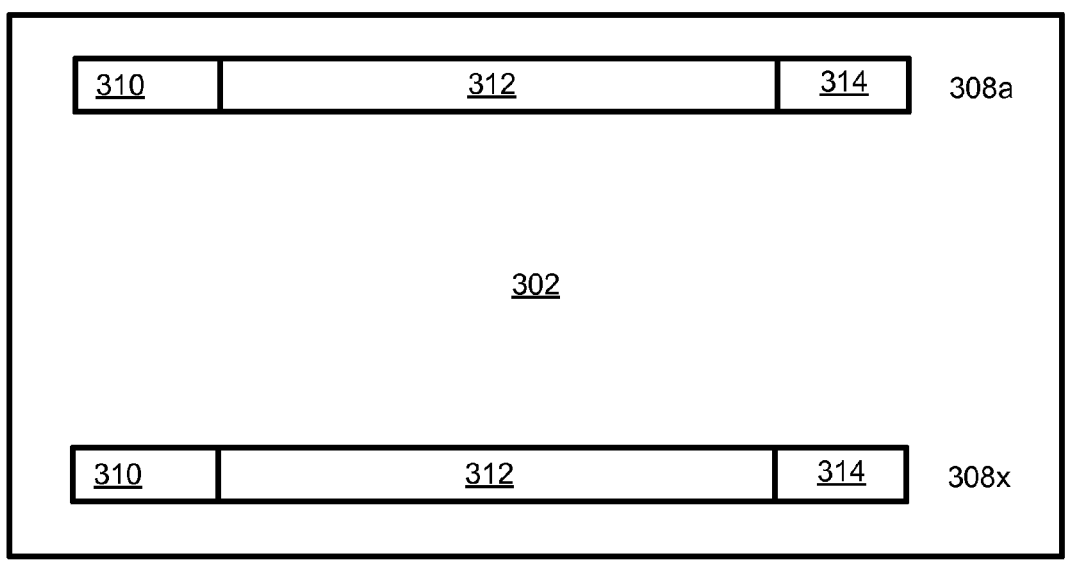

In an embodiment of the invention, device 100 is built around a shared memory architecture, as shown in FIGS. 3a-3b wherein MMU 115 enables sharing of a packet buffer among different ports while providing for resource guarantees for every ingress port, egress port and class of service queue associated with each egress port. FIG. 3a illustrates the shared memory architecture of the present invention. Specifically, the memory resources of device 100 include a Cell Buffer Pool (CBP) memory 302 and a Transaction Queue (XQ) memory 304. CBP memory 302 is an off-chip resource that is made of, according to some embodiments, 4 DRAM chips 306a-306d. According to an embodiment of the invention, each DRAM chip has a capacity of 288 Mbits, wherein the total capacity of CBP memory 302 is 122 Mbytes of raw storage. As shown in FIG. 3b, CBP memory 302 is divided into 256K 576-byte cells 308a-308x, each of which includes a 32 byte header buffer 310, up to 512 bytes for packet data 312 and 32 bytes of reserved space 314. As such, each incoming packet consumes at least one full 576 byte cell 308. Therefore in an example where an incoming includes a 64 byte frame, the incoming packet will have 576 bytes reserved for it even though only 64 bytes of the 576 bytes is used by the frame.

Returning to FIG. 3a, XQ memory 304 includes a list of packet pointers 316a-316x into CBP memory 302, wherein different XQ pointers 316 may be associated with each port. A cell count of CBP memory 302 and a packet count of XQ memory 304 is tracked on an ingress port, egress port and class of service basis. As such, device 100 can provide resource guarantees on a cell and/or packet basis.

Figure 4:
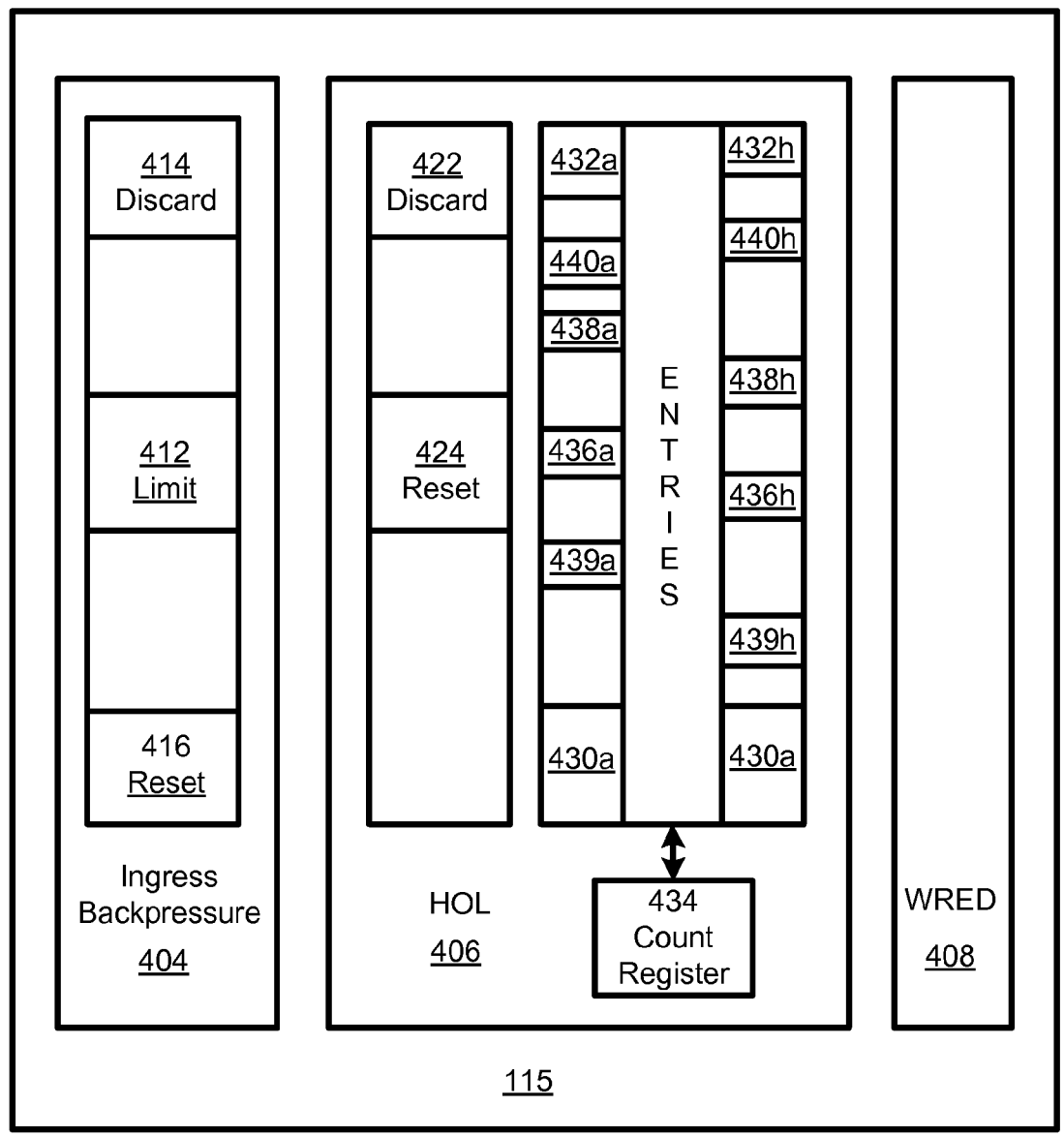
FIG. 4 illustrates buffer management mechanisms that are used by the memory management unit to impose resource allocation limitations and thereby ensure fair access to resource.

Once a packet enters device 100 on a source port 109, the packet is transmitted to parser 130 for processing. During processing, packets on each of the ingress and egress ports share system resources 302 and 304. In specific embodiments, two separate 64 byte bursts of packets are forwarded to the MMU from the local ports and the HiGig port. FIG. 4 illustrates buffer management mechanisms that are used by MMU 115 to impose resource allocation limitations and thereby ensure fair access to resources. MMU 115 includes an ingress backpressure mechanism 404, a head of line mechanism 406 and a weighted random early detection mechanism 408. The Ingress backpressure mechanism 404 supports lossless behaviour and manages buffer resources fairly across ingress ports. Head of line mechanism 406 supports access to buffering resources while optimizing throughput in the system. Weighted random early detection mechanism 408 improves overall network throughput.

The ingress backpressure mechanism 404 uses packet or cell counters to track the number of packets or cells used on an ingress port basis. The ingress backpressure mechanism 404 includes registers for a set of 8 individually configurable thresholds and registers used to specify which of the 8 thresholds are to be used for every ingress port in the system. The set of thresholds include a limit threshold 412, a discard limit threshold 414 and a reset limit threshold 416. If a counter associated with the ingress port packet/cell usage rises above discard limit threshold 414, packets at the ingress port will be dropped. Based on the counters for tracking the number of cells/packets, a pause flow control is used to stop traffic from arriving on an ingress port that have used more than its fair share of buffering resources, thereby stopping traffic from an offending ingress port and relieving congestion caused by the offending ingress port.

Specifically, each ingress port keeps track of whether or not it is in an ingress backpressure state based on ingress backpressure counters relative to the set of thresholds. When the ingress port is in ingress backpressure state, pause flow control frames with a timer value of (0xFFFF) are periodically sent out of that ingress port. When the ingress port is no longer in the ingress backpressure state, the pause flow control frame with a timer value of 0x00 is sent out of the ingress port and traffic is allowed to flow again. If an ingress port is not currently in an ingress backpressure state and the packet counter rises above limit threshold 412, the status for the ingress port transitions into the ingress backpressure state. If the ingress port is in the ingress backpressure state and the packet counter falls below reset limit threshold 416, the status for the port will transition out of the backpressure state.

The head of line mechanism 406 is provided to support fair access to buffering resources while optimizing throughput in the system. The head of line mechanism 406 relies on packet dropping to manage buffering resources and improve the overall system throughput. According to an embodiment of the invention, the head of line mechanism 406 uses egress counters and predefined thresholds to track buffer usage on a egress port and class of service basis and thereafter makes decisions to drop any newly arriving packets on the ingress ports destined to a particular oversubscribed egress port/class of service queue. Head of line mechanism 406 supports different thresholds depending on the color of the newly arriving packet. Packets may be colored based on metering and marking operations that take place in the ingress module and the MMU acts on these packets differently depending on the color of the packet.

According to an embodiment of the invention, head of line mechanism 406 is configurable and operates independently on every class of service queue and across all ports, including the CPU port. Head of line mechanism 406 uses counters that track XQ memory 304 and CBP memory 302 usage and thresholds that are designed to support a static allocation of CBP memory buffers 302 and dynamic allocation of the available XQ memory buffers 304. A discard threshold 422 is defined for all cells in CBP memory 302, regardless of color marking. When the cell counter associated with a port reaches discard threshold 422, the port is transition to a head of line status. Thereafter, the port may transition out of the head of line status if its cell counter falls below a reset limit threshold 424.

For the XQ memory 304, a guaranteed fixed allocation of XQ buffers for each class of service queue is defined by a XQ entry value 430a-430h. Each of XQ entry value 430a-430h defines how many buffer entries should be reserved for an associated queue. For example, if 100 bytes of XQ memory are assigned to a port, the first four class of service queues associated with XQ entries 430a-430d respectively may be assigned the value of 10 bytes and the last four queues associated with XQ entries 430d-430h respectively may be assigned the value of 5 bytes.

According to an embodiment of the invention, even if a queue does not use up all of the buffer entries reserved for it according to the associated XQ entry value, the head of line mechanism 406 may not assign the unused buffer to another queue. Nevertheless, the remaining unassigned 40 bytes of XQ buffers for the port may be shared among all of the class of service queues associated with the port. Limits on how much of the shared pool of the XQ buffer may be consumed by a particular class of service queue is set with a XQ set limit threshold 432. As such, set limit threshold 432 may be used to define the maximum number of buffers that can be used by one queue and to prevent one queue from using all of the available XQ buffers. To ensure that the sum of XQ entry values 430a-430h do not add up to more than the total number of available XQ buffers for the port and to ensure that each class of service queue has access to its quota of XQ buffers as assigned by its entry value 430, the available pool of XQ buffer for each port is tracked using a port dynamic count register 434, wherein the dynamic count register 434 keeps track of the number of available shared XQ buffers for the port. The initial value of dynamic count register 434 is the total number of XQ buffers associated with the port minus a sum of the number of XQ entry values 430a-430h. Dynamic count register 434 is decremented when a class of service queue uses an available XQ buffer after the class of service queue has exceeded its quota as assigned by its XQ entry value 430. Conversely, dynamic count register 434 is incremented when a class of service queue releases a XQ buffer after the class of service queue has exceeded its quota as assigned by its XQ entry value 430.

When a queue requests XQ buffer 304, head of line mechanism 406 determines if all entries used by the queue is less than the XQ entry value 430 for the queue and grants the buffer request if the used entries are less then the XQ entry value 430. If however, the used entries are greater than the XQ entry value 430 for the queue, head of line mechanism 406 determines if the amount requested is less than the total available buffer or less then the maximum amount set for the queue by the associated set limit threshold 432. Set limit threshold 432 is in essence a discard threshold that is associated with the queue, regardless of the color marking of the packet. As such, when the packet count associated with the packet reaches set limit threshold 432, the queue/port enters into a head of line status. When head of line mechanism 406 detects a head of line condition, it sends an update status so that packets can be dropped on the congested port.

However, due to latency, there may be packets in transition between the MMU 115 and the ports and when the status update is sent by head of line mechanism 306. In this case, the packet drops may occur at MMU 115 due to the head of line status. In an embodiment of the invention, due to the pipelining of packets, the dynamic pool of XQ pointers is reduced by a predefined amount. As such, when the number of available XQ pointers is equal to or less than the predefined amount, the port is transition to the head of line status and an update status is sent to by MMU 115 to the ports, thereby reducing the number of packets that may be dropped by MMU 115. To transition out of the head of line status, the XQ packet count for the queue must fall below a reset limit threshold 436.

It is possible for the XQ counter for a particular class of service queue to not reach set limit threshold 432 and still have its packet dropped if the XQ resources for the port are oversubscribed by the other class of service queues. In an embodiment of the invention, intermediate discard thresholds 438 and 439 may also be defined for packets containing specific color markings, wherein each intermediate discard threshold defines when packets of a particular color should be dropped. For example, intermediate discard threshold 438 may be used to define when packets that are colored yellow should be dropped and intermediate discard threshold 439 may be used to define when packets that are colored red should be dropped. According to an embodiment of the invention, packets may be colored one of green, yellow or red depending on the priority level assigned to the packet. To ensure that packets associated with each color are processed in proportion to the color assignment in each queue, one embodiment of the present invention includes a virtual maximum threshold 440. Virtual maximum threshold 440 is equal to the number of unassigned and available buffers divided by the sum of the number of queues and the number of currently used buffers. Virtual maximum threshold 440 ensures that the packets associated with each color are processed in a relative proportion. Therefore, if the number of available unassigned buffers is less than the set limit threshold 432 for a particular queue and the queue requests access to all of the available unassigned buffers, head of line mechanism 406 calculates the virtual maximum threshold 440 for the queue and processes a proportional amount of packets associated with each color relative to the defined ratios for each color.

To conserve register space, the XQ thresholds may be expressed in a compressed form, wherein each unit represents a group of XQ entries. The group size is dependent upon the number of XQ buffers that are associated with a particular egress port/class of service queue.

Weighted random early detection mechanism 408 is a queue management mechanism that pre-emptively drops packets based on a probabilistic algorithm before XQ buffers 304 are exhausted. Weighted random early detection mechanism 408 is therefore used to optimize the overall network throughput. Weighted random early detection mechanism 408 includes an averaging statistic that is used to track each queue length and drop packets based on a drop profile defined for the queue. The drop profile defines a drop probability given a specific average queue size. According to an embodiment of the invention, weighted random early detection mechanism 408 may defined separate profiles on based on a class of service queue and packet.

Figure 5:
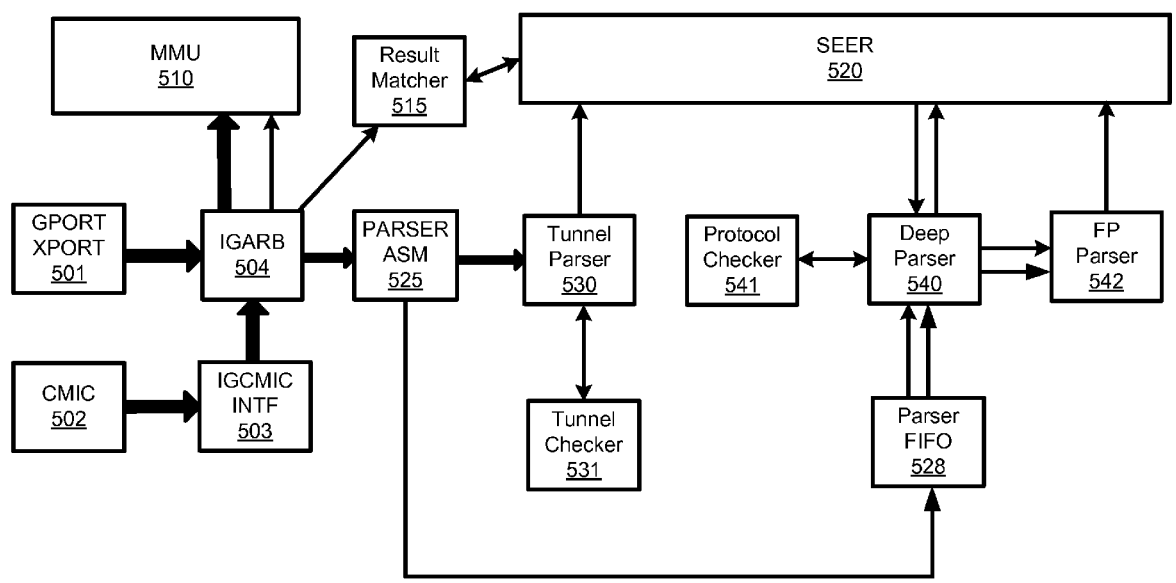
FIG. 5 illustrates a two stage parser, according to certain embodiments of the present invention.

As illustrated in FIG. 1, the MMU 115 receives packet data for storage from the parser 130. As discussed above, the parser 130 includes a two stage parser, where that portion is illustrated schematically in FIG. 5. The data are received at ports 501 of the network device, as discussed above. Data may also be received through the CMIC 502, where that data is passed to an ingress CMIC interface 503. The interface acts to convert the CMIC data from a P-bus format to an ingress data format. In one embodiment, the data is converted from 45-bit to 168-bit format, such that the latter format includes 128-bit data, 16-bit control and possibly a 24-bit HiGig header. The data are thereafter sent in 64-bit bursts to the ingress arbiter 504.

The ingress arbiter 504 receives data from the ports 501 and the ingress CMIC interface 503, and multiplexes those inputs based on time division multiplexing arbitration. Thereafter, the data are sent to the MMU 510, where any HiGig header is removed and the format is set to a MMU interface format. Packet attributes are checked, such as end-to-end, Interrupted Bernoulli Process (IBP) or Head of Line (HOL) packets. In addition, the first 128 bytes of data are snooped and the HiGig header is passed to the parser ASM 525. If the burst of data received contains an end marker, the CRC result is sent to the result matcher 515. Also, the packet length is estimated from the burst length and a 126-bit packet ID is generated for debugging purposes.

The parser ASM 525 converts the 64 data burst, at 4 cycles per burst, into 128-byte burst, at 8 cycles per burst. The 128-byte burst data is forwarded to both the tunnel parser 530 and the parser FIFO 528 at the same time to maintain the same packet order. The tunnel parser 530 determines whether any type of tunnel encapsulation, including MPLS and IP tunneling, is being employed. In addition, the tunnel parser also checks for outer and inner tags. Through the parsing process, the session initiated protocol (SIP) is provided for subnet based VLAN, where the SIP parsing occurs if the packet is an address resolution protocol (ARP), reverse ARP (RARP) or IP packet. A trunk port grid ID is also constructed based on the source trunk map table, unless there is no trunking or if the trunk ID is obtained from the HiGig header.

The tunnel parser 530 works with the tunnel checker 531. The tunnel checker checks the checksum of the IP header, and characteristics of UDP tunneling and IPv6 over IPv4 packets. The tunnel parser 530 utilizes the search engine 520 to determine the tunnel type through preconfigured tables.

The parser FIFO 528 stores 128 bytes of packet headers and 12 bytes of HiGig headers, that is parsed again by the deep parser 540. The header bytes are stored while the search engine completes a search and is ready for the deeper search. Other attributes are also maintained by the FIFO, such as packet length, HiGig header status and the packet ID. The deep parser 540 provides three different types of data, including search results from the search engine 520 that are "flow through," inner parser results and HiGig module header. Special packet types are determined and passed along to the search engine. The deep parser 540 reads the data from the parser FIFO, where pre-defined fields are parsed. The search engine provides lookup results based on the values passed to the search engine, where the packet ID is checked to maintain packet order.

The deep parser 540 also uses the protocol checker 541 to check the inner IP header checksum, check for denial of service attack attributes, errors in the HiGig module header and perform a martian check. The deep parser also works with the field processor parser 542, to parse predefined fields and user defined fields. The predefined fields are received from the deep parser. These fields include MAC destination address, MAC source address, inner and outer tags, Ether type, IP destination and source addresses, Type of Service, IPP, IP flags, TDS, TSS, TTL, TCP flags and flow labels. User defined fields are also parsible, up to 128-bit lengths.

Figure 6:
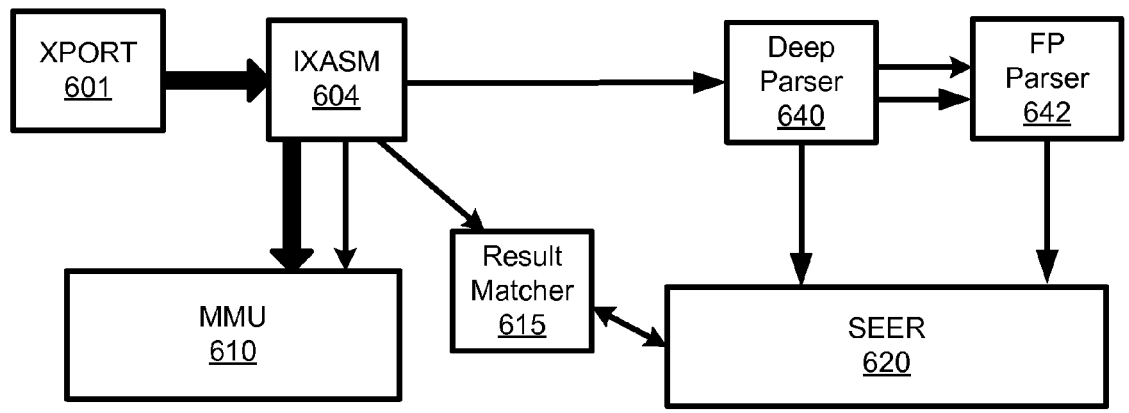
FIG. 6 illustrates another parser for use with interconnected port, according to certain embodiments of the present invention.

As discussed above, the data that is received on the HiGig port is treated separately from other data received on the local ports. As illustrated in FIG. 1, HiGig port 108 has its own buffers and data flows from the port to its own parser 134. The HiGig parser is illustrated in greater detail than FIG. 6. The structure is similar to the two stage parser, illustrated in FIG. 5, with several differences. Data received at the HiGig port 601 is forwarded to the HiGig port assembler 604. The assembler receives the data and HiGig header in 64 byte bursts, with a similar format as used for the local ports. The data are sent to the MMU 610 without the HiGig header and in a MMU interface format.

The first 128 bytes of the data is snooped and sent, along with the HiGig header, to the deep parser 640. With similarity to the two stage parser, end-to-end message are checked, with the parsed results being sent in a side band. Also similarly, the CRC and packet lengths are checked by the result matcher 615. In addition, a 16 bit packet ID is generated for use in debugging and tracking the flow of the packet.

The HiGig version of the deep parser 640 is a subset of the two stage deep parser 540, and performs similar functions. There is, however, no pass through of information from the search engine 620, it cannot skip the MPLS header and parse the payload only and does not send deep data to the search engine. In function, the HiGig version of the FP parser 642 is the same as the FP parser 542 discussed above.

Figure 7:
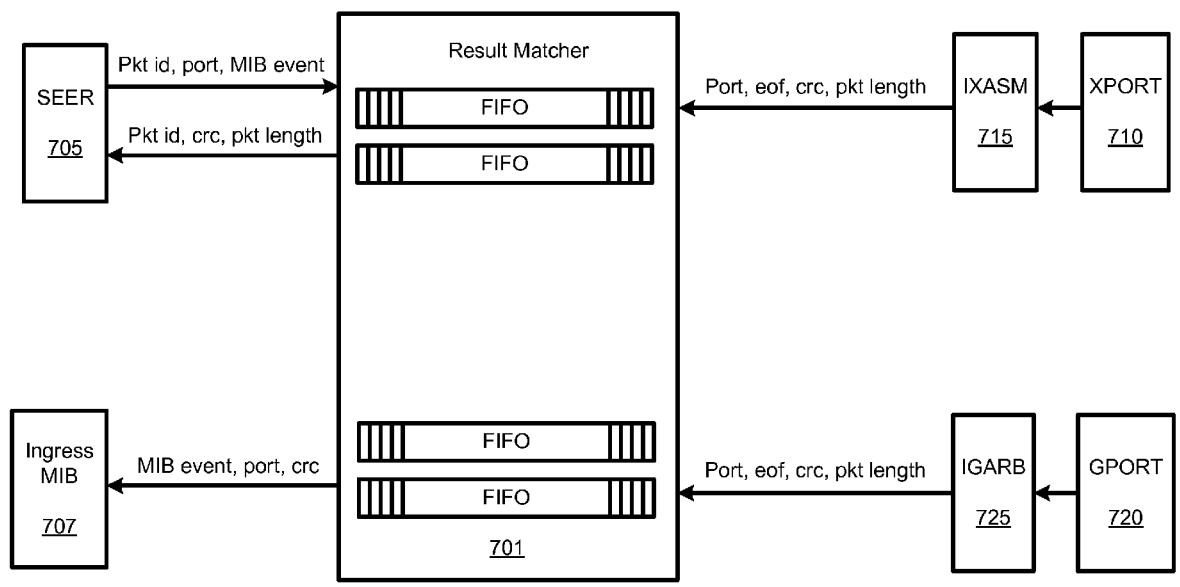
FIG. 7 illustrates a result matcher, according to certain embodiments of the present invention.

The result matcher is illustrated in greater detail in FIG. 7. It is noted that the result matcher may be used commonly between the parsers or each parser may utilize its own result matcher. In the embodiment illustrated, both types of ports 710 & 720 receive data and forward quantities to the result checker through the actions of the ingress assembler 715 and the ingress arbiter 725. The quantities include port number, presence of EOF, the CRC and the packet length. The result matcher acts as a series of FIFOs to match search results through the use of the search engine 705. The tag and the MIB event are matched with the packet length and the CRC status on a per port basis. The search results are provided every 4 cycles for both network ports and HiGig port. The structure allows for results to be stored in the result matcher per port if there is a delay that is longer than the incoming packet time and awaiting the end of packet results when the search delay is shorter than the incoming packet time.

After the process of parsing and evaluating of data received, a forwarding decision is made with regard to the received information. The forwarding decision is generally made as to what destination port the packet data should be sent to, although the decision can be made to drop a packet or forward a packet to a CPU or other controller through the CMIC 111. On egress, the packet is modified based on the parsing and evaluation of the network device. Such modification can include tagging, modification of header information or addition of a module header, if the egress port is the HiGig port. The modification is performed on a cell basis to avoid delays in the forwarding of the packet data.

Figure 8:
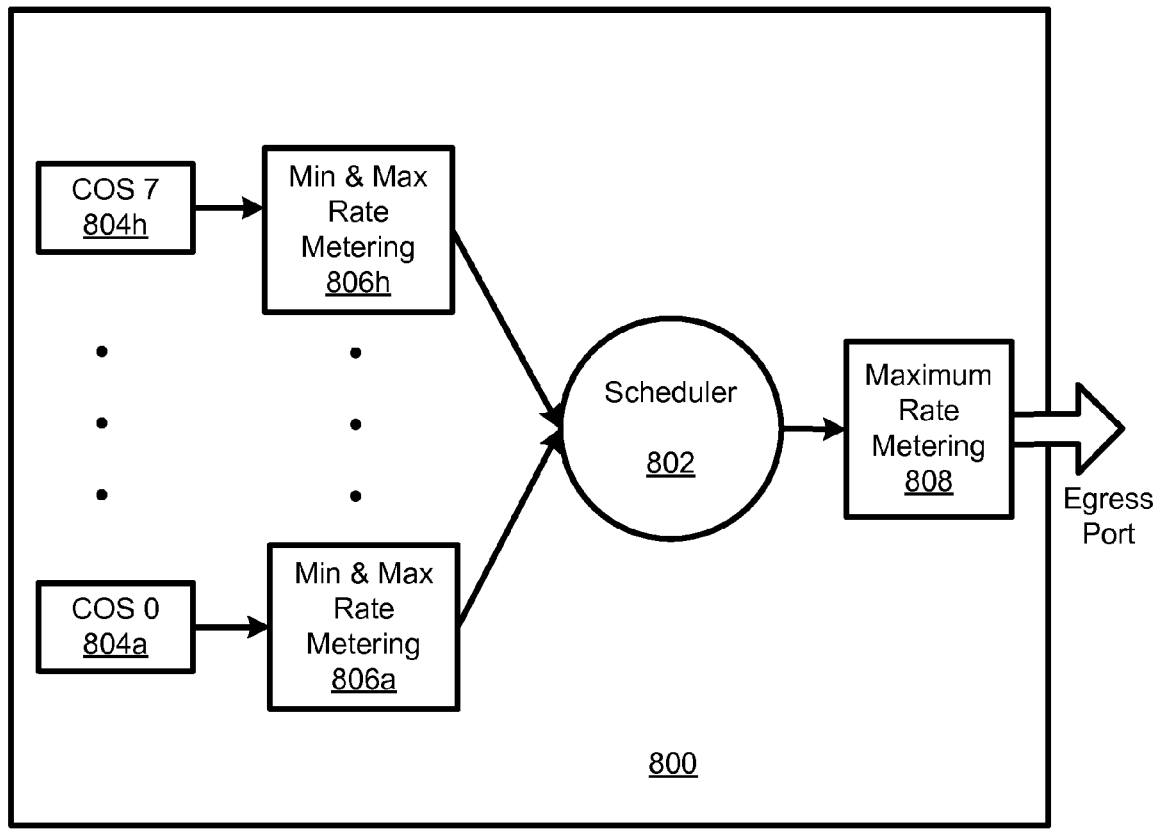
FIG. 8 illustrates a configuration of an egress port arbitration implemented in the present invention.

FIG. 8 illustrates a configuration of an egress port arbitration implemented in the present invention. According to FIG. 8, MMU 115 also includes a scheduler 802 that provides arbitration across the eight class of service queues 804a-804h associated with each egress port to provide minimum and maximum bandwidth guarantees. It is noted that while eight classes of service are discussed, other formulations of classes of service are also supported. Scheduler 802 is integrated with a set of minimum and maximum metering mechanisms 806a-806h that each monitors traffic flows on a class of service basis and an overall egress port basis. Metering mechanisms 806a-806h support traffic shaping functions and guarantee minimum bandwidth specifications on a class of service queue and/or egress port basis, wherein scheduling decisions by schedule 802 are configured largely via traffic shaping mechanisms 806a-406h along with a set of control masks that modify how scheduler 802 uses traffic shaping mechanisms 806a-806h.

As shown in FIG. 8, minimum and maximum metering mechanisms 806a-806h monitor traffic flows on a class of service queue basis and an overall egress port basis. Maximum and minimum bandwidth meters 806a-806h are used to feed state information to scheduler 802 which responds by modifying its service order across class of service queues 804. The network device 100 therefore enables system vendors to implement a quality of service model by configuring class of service queues 804 to support an explicit minimum and maximum bandwidth guarantee. In an embodiment of the invention, metering mechanisms 806a-806h monitor traffic flow on a class of service queue basis, provides state information regarding whether or nor a class of service flow is above or below a specified minimum and maximum bandwidth specification, and transmits the information into scheduler 802 which uses the metering information to modify its scheduling decisions. As such, metering mechanisms 806a-806h aid in partitioning class of service queues 804 into a set of queues that have not met the minimum bandwidth specification, a set that have met its minimum bandwidth but not its maximum bandwidth specification and a set that have exceeded its maximum bandwidth specification. If a queue is in the set that have not met its minimum bandwidth specification and there are packets in the queue, scheduler 802 services the queue according to the configured scheduling discipline. If a queue is in the set that have met its minimum bandwidth specification but has not exceeded it maximum bandwidth specification and there are packets in the queue, scheduler 802 services the queue according to the configured scheduling discipline. If a queue is in the set that have exceeded its maximum bandwidth specification or if the queue is empty, scheduler 802 does not service the queue.

Figure 9:
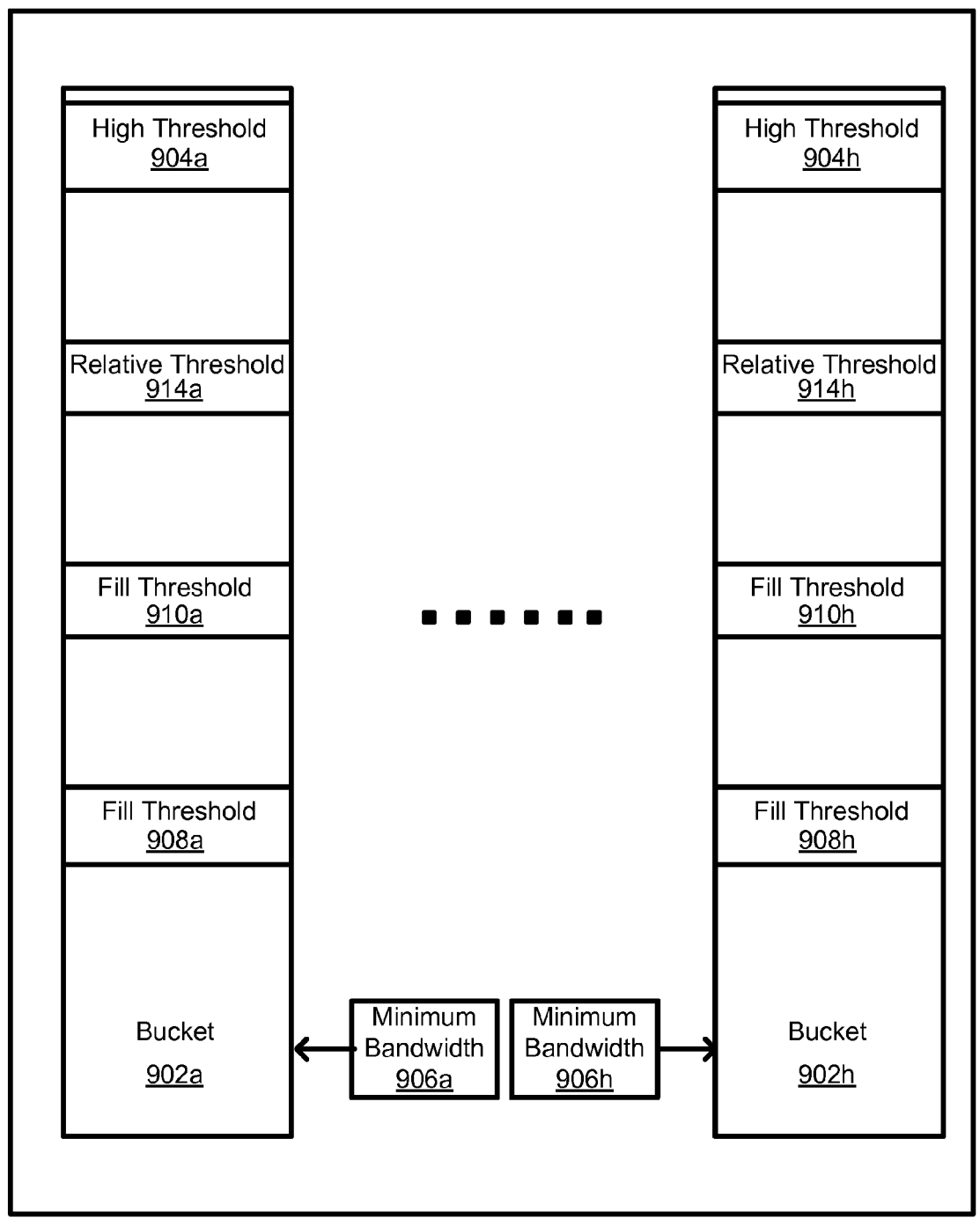
FIG. 9 illustrates an implementation of minimum and maximum bandwidth metering mechanisms, according to certain embodiments of the present invention.

In FIG. 9, the minimum and maximum bandwidth metering mechanisms 806a-806h may be implemented using a simple leaky bucket mechanism which tracks whether or not a class of service queue 804 has consumed its minimum or maximum bandwidth. The range of the minimum and maximum bandwidth setting for each class of service 804 is between 64 kbps to 16 Gbps, in 64 kbps increments. The leaky bucket mechanism has a configurable number of tokens "leaking" out of buckets 902a-902h, each of which is associated with one of queues 804a-804h, at a configurable rate. In metering the minimum bandwidth for a class of service queue 804, as packets enter the class of service queue 804, a number of tokens in proportion to the size of the packet is added to a respective bucket 902, having a ceiling of bucket high threshold 904. The leaky bucket mechanism includes a refresh update interface and a minimum bandwidth 906 which defines how many tokens are to be removed every refresh time unit. A minimum threshold 908 is set to indicate whether a flow has satisfied at least its minimum rate and a fill threshold 910 is set to indicate how many tokens are in leaky bucket 902. When the fill threshold 910 rises above minimum threshold 908, a flag, which indicates that the flow has satisfied its minimum bandwidth specification, is set to true. When fill threshold 910 falls below minimum threshold, the flag is set to false.

The minimum threshold 908 affects what timescale the minimum bandwidth metering mechanism 806 is required to operate. If the minimum threshold 908 is set at a very low level, class of service queue 804 will quickly flag that its minimum bandwidth has been met. This reduces the amount of time queue 804 is classified in the set of queues that have not met the minimum bandwidth requirement and reduces the time period that the queue is given preferential treatment from scheduler 802. The high threshold 904 affects how much credit can be built up after a class of service queue meets it minimum bandwidth 906. A large high threshold 904 may result in a reduction of time that the queue is classified with the set of queues that have not met the minimum bandwidth requirement and reduces the time period that the queue is given preferential treatment from scheduler 802.

After metering mechanisms 806a-806h indicate that the maximum bandwidth specified has exceeded high threshold 904, the scheduler 802 ceases to service the queue and the queue is classified as being in the set of queues that have exceeded it maximum bandwidth specification. A flag is then set to indicate that the queue has exceeded its maximum bandwidth. Thereafter, the queue will only receive service from scheduler 802 when its fill threshold falls below high threshold 904 and the flag indicating that it has exceeded its maximum bandwidth is reset. Metering mechanism 806i is used to indicate that the maximum bandwidth specified for a port has been exceeded and operates in the same manner as meter mechanisms 806a-806h when the maximum bandwidth has been exceeded. According to an embodiment of the invention, the maximum metering mechanism on a queue and port basis generally affects whether or not queue 804 or a port is to be included in scheduling arbitration. As such, the maximum metering mechanism only has a traffic limiting effect on scheduler 802.

On the other hand, the minimum metering on a class of service queue 804 basis has a more complex interaction with scheduler 802. In one embodiment of the invention, scheduler 802 is configured to support a variety of scheduling disciplines that mimic the bandwidth sharing capabilities of a weighted fair queuing scheme. The weighted fair queue scheme is a weighted version of packet based fair queuing scheme, which is defined as a method for providing "bit-based round robin" scheduling of packets. As such, packets are scheduled for access to an egress port based on their delivery time, which is computed as if the scheduler is capable of providing bit-based round robin service. A relative weight field influences the specifics of how the scheduler makes use of the minimum metering mechanism, wherein the scheduler attempts to provide a minimum bandwidth guarantee.

The present invention utilizes 512K buckets in an external memory, as discussed above. The traditional method of background filling of the buckets does not scale to this many buckets without utilizing all available bandwidth. The fastest the system could can loop the external memory and background fill each bucket is ~25 ms. Since the greater the period between background filling of buckets, the less accurate the marking of the packets will be, a background filling of the buckets is not feasible. To support 512K buckets, a timestamp method may be used to increase the accuracy of the metering process. The timestamp method, however, increases the computation needed in the design.

Figure 10A:
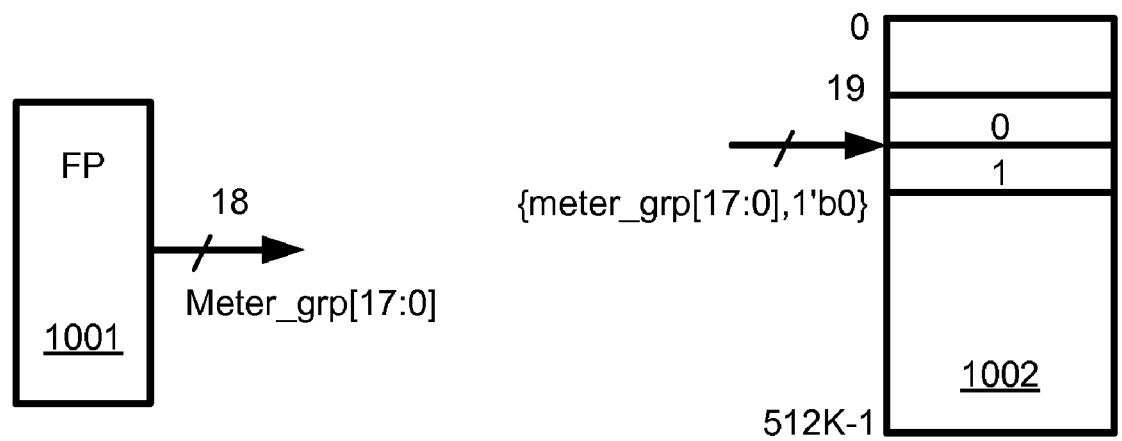
FIG. 10 illustrates the metering of packets, with FIG. 10(a) illustrating the mapping of the flowID to the buckets, FIG. 10(b) illustrating a generic metering bucket and FIG. 10(c) a metering bucket using a timestamp method.

The packet classification process assigns a metering group identifier to each packet received, where this classification is accomplished in the FP block 1001. The metering block uses the metering group identifier to know which bucket(s) the metering block should use to determine the color of the packet. The external FP CAM engine classifies packets into 256K flows. The external memory contains 512K buckets which comprise 256K "dual" leaky buckets. The memory is burst of two so the dual bucket is always [even, odd] bucket pairs. Each "dual" leaky bucket is assigned to a metering group. The FIG. 10(a) shows how the metering groups map to the external memory's address space 1002.

Figure 10B:

A generic metering bucket might contain the following fields: rate, burst size and token count, as illustrated in FIG. 10(b). The rate and burst size fields are programmed by software, the hardware does not modify these fields. The token count field is the "bucket" which the hardware modifies. The rate field specifies the rate the bucket (token count) is required to fill. The burst size specifies the maximum amount the bucket (token count) is allowed to fill to. Two events can modify the token count field. The first is the receiving of a packet that is classified to the bucket's flow. When a packet is classified to a particular bucket, the token count field of that bucket may be decremented in an amount equal to the packet's length.

The second event is the background filling process. The background filling process increments the token count in an amount equal to the rate field of the bucket. The rate field is usually defined in such a way that it's value is directly added to the token count. For example, it the unit of the token count field is ½ bit and the background filling process loops every 8 us, the rate field's unit can be defined as ½ bit per 8 us. In this case, the background filling process can directly add the value in the rate field to the token count field.

The first event (receive packet) only subtracts from the token count while the second event (background filling) only adds to the token count. This makes the mathematical operation required on the token count quite simple. At any given cycle only one addition or one subtraction needs to take place. The actual marking decision is based on the value of token count and is discussed below.

It is impossible to make the background filling ideal. An ideal filling of the bucket is different than a background filling with a quantization of 8 us. It will be shown how this quantization causes packets to be marked differently from the ideal case. For equal-sized packets arriving at twice the bucket's rate, the packets are marked differently between the ideal case and the quantized (8 us) case. If a simple single bucket is being used, using a two color marking scheme, when the token count field is greater than or equal to the packet's size, the packet is marked green and the token count field is decremented by the packet's size. If the token count field is less than the packet's size, the packet is marked "red" and the token count field is not modified. Since the packets are arriving at twice the bucket's rate, half of the packets should be marked as red and half should be marked as green. In some cases however, 10 green packets may be followed by 10 red packets. Over long periods of time the marking of packets is correct, but if a small window of time is examined, the marking of packets is markedly different.

A 25 ms background filling will produce radically different color marking than the ideal case. If a maximum packet rate of 24 Gbits/s (12 1 G-ports and a 12 G-port) is assumed, and assuming 64-byte packets at 24 Gbits/s, then ~900,000 packets in 25 ms are received. Assuming a bucket with a rate of 12 Gbits/s and 24 Gbits/s worth of 64-byte packets are classified to this bucket. In this case, ~450,000 packets in a row will be marked as red followed by ~450,000 packets marked as green. That, unfortunately, does not provide proper marking.

To improve the accuracy of the metering a timestamp method is employed instead of a background filling method. The timestamp method dramatically improves the accuracy of the metering for a given background bandwidth allocation at the expense of memory storage for a timestamp field and extra computation logic. In fact, with the same bandwidth allocation that produces a quantization of 25 ms for background filling 512K buckets, the timestamp method can achieve an accuracy equivalent to a quantization of 1 us.

Figure 10C:

The timestamp method requires a timestamp field to be added to the definition of the bucket, as illustrated in FIG. 10(c). With the timestamp method, the main event that triggers the token count to be updated is the receipt of a packet. The timestamp background process is a minor event that updates the token count only to prevent counter rollover, as explained below.

An internal counter (current_time) with the same width as the timestamp field increments periodically, say every 1 us. The receipt of a packet triggers a *multiple* of rate to be added to token count. This is different from the filling background process where the rate is directly added to token count periodically. The multiple of rate is directly related to how much time has elapsed since the last packet was received for the bucket. The elapsed time between packets is equal to the difference between the current_time and the timestamp field of the bucket.

The equation for current_tc is shown below:

$$\text{current\_tc} = ((\text{current\_time} - \text{timestamp}) * \text{rate}) + \text{token count} \quad (1)$$

The color of the packet is determined based on current_tc. The marking of the packet might require the packet's length to be subtracted from current_tc. This value (new_tc) is calculated as shown below:

$$\text{new\_tc} = \text{current\_tc} - \text{packet\_length} \quad (2)$$

The final step is to write new_tc and current_time back to the token count and timestamp fields respectively. The token count field has no meaning without the timestamp field since it is only accurate at the time indicated by the timestamp field. This is why the timestamp field is always updated to the current_time whenever the token count field is updated. This is different from the filling background process where the token count is always accurate to within filling background process's quantization time, i.e. 8 us.

Figure 11:
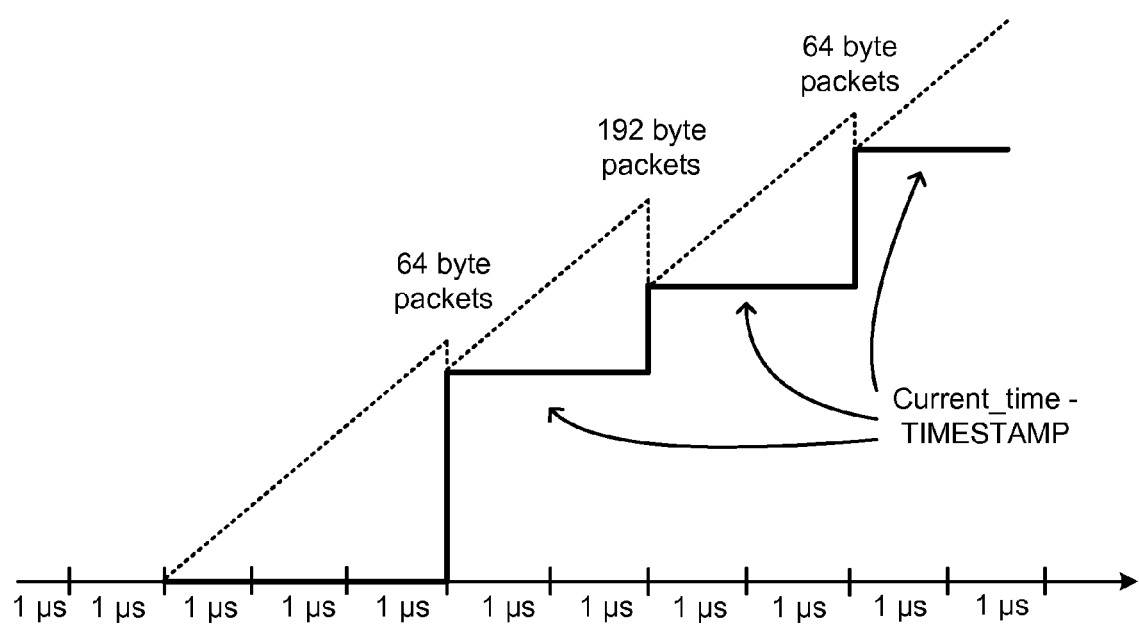
FIG. 11 illustrates a graph comparing the computation of the current timestamp with the value of the token count field, according to one embodiment of the present invention.

FIG. 11 illustrates the calculation of current_tc at the arrival of packets as the vertical dashed line. The solid line is the value of the token count field. The dashed lines are the ideal filling of the bucket. At the arrival of each packet, the current_tc is calculated (vertical dashed lines). Since the packets are in profile, new_tc is written back to the token count. Between packets we see the token count is constant. The process repeats for each packet that is classified to this bucket.

If the current_time counter increments every 1 us as shown in FIG. 11, the calculation is accurate to within 1 us of the ideal filling. The quantization error in the timestamp method is dictated by the frequency current_time increments instead of the rate of the background filling process. It does not matter how much time elapsed between packets, the calculation is always accurate to within 1 us. Increasing the frequency current_time increments decreases the quantization error of the marker. A current_time that increments every clock cycle would produce an ideal marker. Unfortunately, as discussed below, increasing the frequency current_time increments also increases the width of the timestamp field for a given background bandwidth allocation. The trade-off is memory space for accuracy.

A complication arises from the fact that the internal counter (current_time) will eventually loop. For example, a 17 bit counter that increments every 1 us will loop every 131 ms. Once the current_time counter starts looping the equation (current_time−timestamp) is no longer accurate. Without adding additional logic, if a packet does not arrive at a metering bucket for more than 1 loop of current_time (131 ms), the elapsed time can no longer be correctly tracked. Therefore, a timestamp background process is still needed to keep the timestamp fields of all the buckets from going stale. The token count and timestamp fields of all the buckets must be updated at least once per 131 ms for the current_time counter described above. The timestamp background process updates the token count field based on equation (1) and the timestamp field is set to current_time. As long as the timestamp is not stale, equation (1) will always be accurate.

In the examples shown above, the timestamp method produced current_tc with an accuracy to within 1 us of the ideal filling case with a timestamp background process that only updates every bucket in 131 ms. For the background filling method to achieve the same accuracy requires the background filling to update every bucket in 1 us. It is easy to deduce the trade-off between the background filling method and the timestamp method. The trade-off is increased memory utilization (timestamp field) and computation logic (rate must be multiplied) to save memory bandwidth.

and a Peak bucket. The two scheme differ in the way the buckets are filled and decremented as well as how packets are marked.

In the srTCM scheme, the two buckets that constitute the dual bucket fill dependently with the same Committed Information Rate (CIR). The Committed bucket fills to the Committed Burst Size (CBS) first. Only when the Committed bucket is "full" can the Excess bucket fill to the EBS. In the trTCM scheme, the two buckets that constitute the dual bucket fill independently at different rates. The Committed bucket fills at the Committed Information Rate (CIR) to CBS while the Peak bucket fills at the Peak Information Rate (PIR) to PBS in parallel.

The two schemes also differ in how the buckets are decremented as well as how packets are marked based on the state of the dual bucket. This is shown in the following four tables. The first two rows are the inputs to the decision. The next row is the output color decision. The last two rows indicate whether to decrement the buckets by the packet length or not.

TABLE 1

| | Bucket C In Profile/Bucket E In Profile | | | | | | | | | | | |
|---|---|---|---|---|---|---|---|---|---|---|---|---|
| | 0/0 | | | 0/1 | | | 1/0 | | | 1/1 | | |
| Incoming Color | R | Y | G | R | Y | G | R | Y | G | R | Y | G |
| Outgoing Color | R | R | R | Y | Y | Y | G | G | G | G | G | G |
| Decrement bucket C | No | No | No | No | No | No | Yes | Yes | Yes | Yes | Yes | Yes |
| Decrement bucket E | No | No | No | Yes | Yes | Yes | No | No | No | No | No | No |

TABLE 2

| | Bucket C In Profile/Bucket E In Profile | | | | | | | | | | | |
|---|---|---|---|---|---|---|---|---|---|---|---|---|
| | 0/0 | | | 0/1 | | | 1/0 | | | 1/1 | | |
| Incoming Color | R | Y | G | R | Y | G | R | Y | G | R | Y | G |
| Outgoing Color | R | R | R | R | Y | Y | R | R | G | R | Y | G |
| Decrement bucket C | No | No | No | No | No | No | No | No | Yes | No | No | Yes |
| Decrement bucket E | No | No | No | No | Yes | Yes | No | No | No | No | Yes | No |

TABLE 3

| | Bucket C In Profile/Bucket P In Profile | | | | | | | | | | | |
|---|---|---|---|---|---|---|---|---|---|---|---|---|
| | 0/0 | | | 0/1 | | | 1/0 | | | 1/1 | | |
| Incoming Color | R | Y | G | R | Y | G | R | Y | G | R | Y | G |
| Outgoing Color | R | R | R | Y | Y | Y | R | R | R | G | G | G |
| Decrement bucket C | No | No | No | No | No | No | No | No | No | Yes | Yes | Yes |
| Decrement bucket E | No | No | No | Yes | Yes | Yes | No | No | No | Yes | Yes | Yes |

TABLE 4

| | Bucket C In Profile/Bucket P In Profile | | | | | | | | | | | |
|---|---|---|---|---|---|---|---|---|---|---|---|---|
| | 0/0 | | | 0/1 | | | 1/0 | | | 1/1 | | |
| Incoming Color | R | Y | G | R | Y | G | R | Y | G | R | Y | G |
| Outgoing Color | R | R | R | R | Y | Y | R | R | R | R | Y | G |
| Decrement bucket C | No | No | No | No | No | No | No | No | No | No | No | Yes |
| Decrement bucket E | No | No | No | No | Yes | Yes | No | No | No | No | Yes | Yes |

Both srTCM (Single Rate Three Color Marker) and trTCM (Two Rate Three Color Marker) utilize two buckets (a dual bucket) to perform three color (red, yellow, green) marking of packets. The srTCM scheme utilizes a Committed bucket and an Excess bucket while trTCM utilizes a Committed bucket As discussed above, there are two variables involved in calculating the width required for the timestamp field (ts_width): the time is takes the timestamp background process to service every bucket (loop_period) and the frequency current_time increments, or equivalently the unit of current_time (counter_unit). Basically, the timestamp background process must service every bucket as fast or faster than the current_time counter rolls over. However, the solution presented below requires the timestamp background process to service every bucket twice in the time it takes the current_time counter to loop. The equation that relates these variables is as follows:

$$\text{loop\_period} = \tfrac{1}{2}\,(2\text{ts\_width} \times \text{counter\_unit}) \quad (3)$$

Solving for ts_width results in:

$$\text{ts\_width} = \log 2\,((2*\text{loop\_period})/\text{counter\_unit}) \quad (4)$$

If the loop_period is 25 ms (25000 us) and counter_unit is 1 us then the width required for the timestamp field is 15.6 or 16 bits.

The computation increase is significant. The background filling method requires no more than an addition or subtraction on the token count field. The timestamp method requires performing equations (1) and (2) for each packet received and requires equation (1) for the timestamp background process.

The multiplication in equations (1) is extensive from a time perspective. One possible solution to simplify the multiplication is to reduce it to a shift operation on rate. For example, if (current_time−timestamp) is 240 or 'b11110000 in binary, the rate may be multiplied by 128 or 'b10000000 instead. This is simply a shift operation of 7 on rate. The remaining time we missed by simplifying the multiplication can be taken into account by adjusting the timestamp field. In the case above, 122 time units of time were missed. Therefore, instead of setting the timestamp field to current_time, it is set to current_time−122. This will force the (current_time−timestamp) value for the next packet to be 122 time units larger, therefore taking into account the missing time.

The above solution reduces the multiplication in equation (1) to a shift operation on rate and adds a subtraction to modify the timestamp field to take into account the missing time. A pseudo code version of equation (1) using the simplified multiplication above might be (assume timestamp is 4 bits):

```
delta_t[3:0] = (current_time − TIMESTAMP)
if (delta_t[3])
  current_tc = (RATE << 3) + TOKEN COUNT
  missed_time = {1'b0, delta[2:0]}
else if (delta_t[2])
  current_tc = (RATE << 2) + TOKEN COUNT
  missed_time = {2'b0, delta[1:0]}
else if (delta_t[1])
  current_tc = (RATE << 1) + TOKEN COUNT
  missed_time = {3'b0, delta[0]}
else if (delta_t[0])
  current_tc = RATE + TOKEN COUNT
  missed_time = 4'b0
else
  current_tc = RATE
  missed_time = 4'b0
new_tc = current_tc − packet_length
```

Finally, missed_time is used to calculate the value for the TIMESTAMP field:

$$\text{new\_ts} = \text{current\_time} - \text{missed\_time} \quad (5)$$

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. An apparatus comprising:
   a plurality of egress ports, each egress port configured to transmit data to at least one other apparatus; and
   a metering unit configured to regulate, at least in part, a flow of the data transmitted, by an egress port, to the at least one other apparatus,
   wherein the metering unit includes a plurality of token buckets,
   wherein each token bucket is associated with a rate value, a token count value, and a timestamp value, and
   wherein the token count value of a respective token bucket is updated, when new data is associated with the respective token bucket with, in part, a portion of the rate value, wherein the portion of the rate value is based upon the timestamp value.

2. The apparatus of claim 1, wherein the timestamp value is associated with the time when the data was most recently associated with respective token bucket.

3. The apparatus of claim 1, wherein the token count value is updated by computing the previous token count value plus a portion of the rate value minus an amount of new data associated with the token bucket; and wherein the portion of the rate value is determined based upon an amount of time since previous data was most recently associated with the token bucket.

4. The apparatus of claim 3, wherein the portion of the rate value is computed by performing a shift operation on the rate value, based upon the binary logarithm of a value that represents the amount of time since previous data was most recently associated with the token bucket; and wherein an updated timestamp value includes a timestamp value that indicates when the new data was associated with the token bucket minus a missing time value that represents an amount of time unaccounted for by the shift operation of the rate value.

5. The apparatus of claim 1, wherein the plurality of token buckets are grouped into token bucket pairs, wherein each token bucket pair includes a first token bucket and a second token bucket, and each token bucket pair is associated with a flow of data; and wherein the metering unit is configured to employ a Three Color Marker scheme to categorize data in flows of data, based upon the token count values of the respective token bucket pairs.

6. The apparatus of claim 1, wherein the token count value is accurate only to the time indicated by the timestamp value.

7. The apparatus of claim 1, wherein the metering unit is further configured to periodically determine if the timestamp value of a token bucket has been updated within a predetermined amount of time, and if the timestamp value of the token bucket has not been updated within the predetermined amount of time, update the timestamp value and update the token count value.

8. The apparatus of claim 7, wherein the predetermined amount of time is based, at least in part, upon the number of bits employed to store the timestamp value.

9. A method of regulating data flow by employing a networking apparatus comprising:
   receiving a packet of data;
   associating the received packet of data with a data flow;
   regulating the data flow by employing at least one token bucket, wherein the token bucket includes a rate value, a token count value, and a timestamp value, wherein the timestamp value indicates when the token count value was last replenished; and in response to associating the received packet of data with the data flow, replenishing the token count value of the token bucket with, in part, a portion of the rate value, wherein the portion of the rate value is based upon the timestamp value.

10. The method of claim 9, wherein replenishing the token count value includes computing the previous token count value plus a portion of the rate value minus an amount of received data associated with the token bucket; and wherein the portion of the rate value is determined based upon an amount of time since previous data was most recently associated with the token bucket.

11. The method of claim 10, wherein the portion of the rate value is computed by performing a shift operation on the rate value, based upon the binary logarithm of a value that represents the amount of time since previous data was most recently associated with the token bucket; and further including updating the timestamp value with a timestamp value that indicates when the new data was associated with the token bucket minus a missing time value that represents an amount of time unaccounted for by the shift operation of the rate value.

12. The method of claim 9, wherein the plurality of token buckets are grouped into token bucket pairs, wherein each token bucket pair includes a first token bucket and a second token bucket, and each token bucket pair is associated with a flow of data; and further including employing a Three Color Marker scheme to categorize data in flows of data, based upon the token count values of the respective token bucket pairs.

13. The method of claim 9, wherein the token count value is accurate only to the time indicated by the timestamp value.

14. The method of claim 9, further including periodically determining if the timestamp value of a token bucket has been updated within a predetermined amount of time, and if the timestamp value of the token bucket has not been updated within the predetermined amount of time, updating the timestamp value and update the token count value.

15. The method of claim 14, wherein the predetermined amount of time is based, at least in part, upon the number of bits employed to store the timestamp value.

16. An apparatus comprising:

a plurality of communication means, each communication means configured to transmit data to at least one other apparatus; and a regulating means configured to regulate, at least in part, a flow of the data transmitted, by an communication means, to the at least one other apparatus, wherein the regulating means includes a plurality of token buckets, wherein each token bucket is associated with a rate value, a token count value, and a timestamp value, and wherein the token count value is updated, based at least in part upon a portion of the rate value determined based upon the timestamp, when new data is associated with the token bucket.

17. The apparatus of claim 16, wherein the timestamp value is associated with the time when a value derived from the rate value was most recently applied to the token count value.

18. The apparatus of claim 16, wherein regulating means is configured to update the token count value by computing the previous token count value plus a portion of the rate value minus an amount of new data associated with the token bucket; and wherein the portion of the rate value is determined based upon an amount of time since previous data was most recently associated with the token bucket.

19. The apparatus of claim 18, wherein the portion of the rate value is computed by performing a shift operation on the rate value, based upon the binary logarithm of a value that represents the amount of time since previous data was most recently associated with the token bucket; and wherein an updated timestamp value includes a timestamp value that indicates when the new data was associated with the token bucket minus a missing time value that represents an amount of time unaccounted for by the shift operation of the rate value.

20. The apparatus of claim 16, wherein the regulating means is further configured to periodically determine if the timestamp value of a token bucket has been updated within a predetermined amount of time, and if the timestamp value of the token bucket has not been updated within the predetermined amount of time, update the timestamp value and update the token count value.

* * * * *

UNITED STATES PATENT AND TRADEMARK OFFICE
CERTIFICATE OF CORRECTION

| | | |
|---|---|---|
| PATENT NO. | : 8,085,668 B2 | Page 1 of 1 |
| APPLICATION NO. | : 12/508406 | |
| DATED | : December 27, 2011 | |
| INVENTOR(S) | : Brandon Carl Smith et al. | |

It is certified that error appears in the above-identified patent and that said Letters Patent is hereby corrected as shown below:

On Title page, in field (57), under "ABSTRACT", in column 2, line 4, after "configured" insert -- to --.

In column 1, line 7, after "2005," delete "now pending,".

Signed and Sealed this
Nineteenth Day of June, 2012

David J. Kappos
*Director of the United States Patent and Trademark Office*